May 18, 1937.　　　　I. WOLFF　　　　2,080,554
VOLUME CONTROL SYSTEM
Filed Oct. 31, 1934　　　2 Sheets-Sheet 1
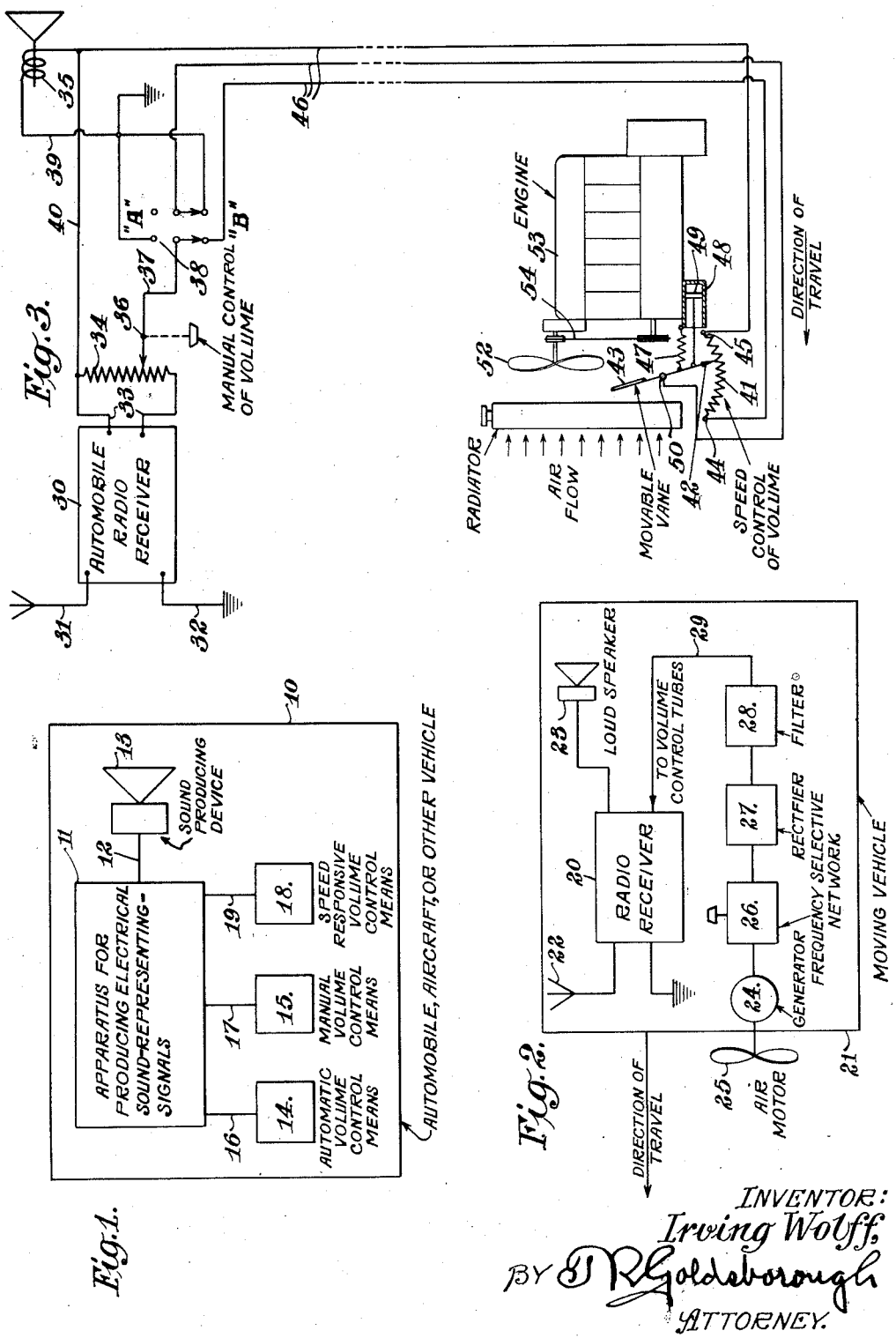
INVENTOR:
Irving Wolff
BY J R Goldsborough
ATTORNEY.

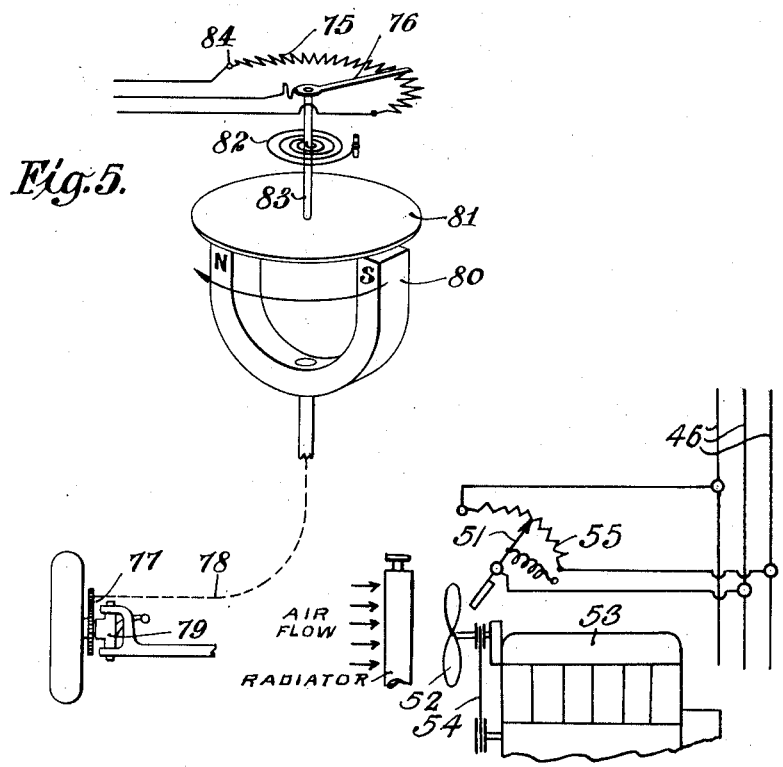
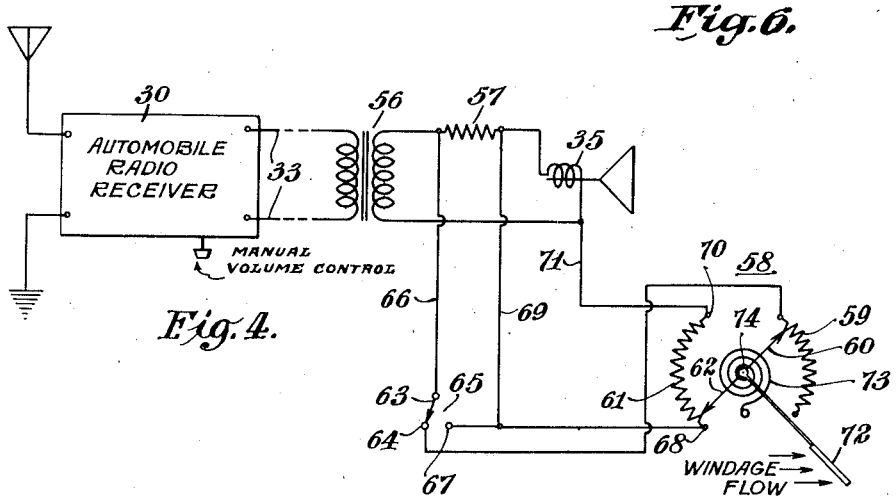

Patented May 18, 1937

2,080,554

UNITED STATES PATENT OFFICE 2,080,554

VOLUME CONTROL SYSTEM

Irving Wolff, Merchantville, N. J., assignor, by mesne assignments, to Radio Corporation of America, New York, N. Y., a corporation of Delaware Application October 31, 1934, Serial No. 750,792

19 Claims. (Cl. 250—20)

The present invention relates to automobile radio receivers, and similar sound producing apparatus adapted for use in vehicles, aircraft and the like, and more particularly it relates to a volume control system for apparatus of the above character.

It has been found, in the reception of intelligence, signals such as radio broadcast programs, police calls and code signals in moving vehicles, the windage and motor noises which increase with speed of travel, interfere with the normal sound production from the loudspeaker or other device furnishing the sound output means for the apparatus, and that to compensate for the interfering noises, the volume level of the apparatus must be increased with the speed of travel in order to maintain an effect upon the ear of constant volume.

The reception of police calls and code signals is particularly difficult unless of a higher sound level at all times than the interfering noise level caused by operation of the vehicle or craft because of similar frequency range of sound. Clear reception of police intelligence is particularly important at varying speeds of travel including high speeds without interruption.

The invention, therefore, has for its primary object to provide a speed responsive automatic volume control means or system for mobile sound producing apparatus such as an automobile radio receiver.

In the case of automobile radio receivers, this requires constant adjustment and readjustment of the volume control means by the operator, usually the driver, and causes appreciable interference with enjoyment of a program from any station being received. If the volume of the receiver is increased when the automobile speeds up to raise the sound production above the noise level, the apparent volume and intelligibility remains more equally constant. Likewise, when the speed of the automobile is reduced, the volume level is preferably reduced accordingly to maintain the same apparent volume level.

Accordingly, it is also an object of the present invention to provide a speed responsive automatic volume control system for mobile sound producing apparatus, such as an automobile radio receiver.

It is a further object of the invention to provide an improved volume control system for radio receiving apparatus and the like which will automatically compensate for interference with sound production therefrom because of increased windage, motor and other noises incidental to increased speed of travel of the vehicle, air craft or the like by which the apparatus is carried.

It is also a further object of the present invention to provide means in connection with mobile radio receiving apparatus for increasing the sound output therefrom automatically to correspond with increases in windage noises, whereby the apparent sound volume and the intelligibility may remain substantially constant.

It is a still further object of the present invention to provide an improved volume control system for mobile sound producing apparatus and the like, which operates to vary the sound output level of said apparatus in response to variations in speed of travel of the vehicle by which the apparatus is carried.

It is also a further object of the invention to provide an improved volume control system for automobile radio receiving apparatus and the like which may be responsive to the speed of travel of the vehicle, the speed of operation of the engine, or jointly to both the speed of travel and the speed of the engine, whereby sound compensation may be provided for the varying noise level caused by variations in the speed of travel of the vehicle or operation of the motor at various speeds.

It is also a further object of the invention to provide a volume control system for mobile radio receiving apparatus which is independent of other volume control means therefor and which is responsive to variations in the flow of air or other fluid.

In a preferred embodiment of the invention I provide a movable vane in a position on the vehicle to receive air currents incidental to the passage of the vehicle through the air at varying speeds, and connect the movable vane to controlling means for the radio receiving or other sound reproducing apparatus, to increase the sound output therefrom as the vane receives increasing air pressure.

The speed responsive volume control means thus provided, is arranged to be independent of other control means for the apparatus, such as manual and automatic volume control means usually provided, and after the volume has been adjusted to a desired level with the vehicle at rest or in motion at low speeds, serves to maintain the volume level high enough to overcome the noise level at the higher speeds without attention from the listener. By means of the volume control system, the volume is automatically increased to compensate for the effect of interference from sounds produced by the motor or by windage about the vehicle as the speed increases above a predetermined normal speed.

The invention will, however, be better understood from the following description when considered in connection with the accompanying drawings and its scope will be pointed out in the appended claims. In the drawings—

Figure 1 is a diagram illustrating a volume control system for sound producing apparatus adapted for use in automobiles, aircraft and other vehicles and embodying the invention, Fig. 2 is a similar diagram of a speed responsive volume control system embodying the invention as applied to a mobile radio receiver, Fig. 3 is a schematic circuit diagram of a speed responsive volume control system embodying the invention and as adapted for use in connection with automobiles and like vehicles, Fig. 4 is a similar circuit diagram showing a modification of the system shown in Fig. 3, Fig. 5 is a diagram showing a modification of a driving means for a control element of the type employed in the systems shown in Figs. 3 and 4, and Fig. 6 is a schematic circuit diagram showing a modification of the system of Fig. 3.

Referring to Fig. 1, the outline indicated at 10 represents an automobile, aircraft or other vehicle to which sound producing apparatus, such as phonograph or radio apparatus, may be applied for the production of sounds while the vehicle is in motion.

As shown in the diagram, sound producing apparatus indicated at 11 may be connected, as indicated by the line 12, with a sound producing device or loudspeaker 13, and may be provided with any suitable volume control means normally required to control it. Such means in the present example are indicated at 14 and 15 as automatic and manual volume control means, the connection with the apparatus being indicated by the connecting lines 16 and 17 respectively. It should be understood that any suitable sound producing apparatus adapted for vehicle use may be provided and in turn may be controlled by any suitable volume control means.

In accordance with the invention, additional means is provided for independently effecting control of the volume or sound output of the apparatus, in accordance with changes in the speed of travel of the vehicle, and such means is diagrammatically indicated at 18, the connection with the apparatus being indicated by the line 19.

It will be noted from consideration of Fig. 1 that the speed responsive volume control means is independent of the other volume control means provided, although it may also merely be independently effective to control the volume. In a practical embodiment of the invention, it may also be located remotely from the apparatus, as will be seen hereinafter.

Referring now to Fig. 2, means in accordance with the system shown in Fig. 1 is provided for controlling the output volume of a radio receiver 20 which is carried by a moving vehicle, indicated by the outline 21.

The radio receiver is provided with signal collecting means represented by the antenna 22 and is further provided with a sound output means represented by the loudspeaker 23. The receiver may be provided with any suitable volume control means and, in addition, is arranged to be controlled in volume by potentials derived from a wind driven generator indicated at 24.

The generator may be of the alternating or direct current type and is arranged to provide controlling potentials which vary with the speed of travel of the vehicle. To this end the generator is provided with a driving air motor or propeller, indicated at 35, which is preferably located at a suitable point on the vehicle to receive the windage or air currents as the vehicle moves. The potential provided by the generator may be suitably filtered and adapted for use in connection with the control circuits of the receiver and, in the present example, may be assumed to be of the alternating current type.

For the purpose of smoothing, filtering, and controlling the alternating current potentials derived from the generator 24, a frequency selective network indicated at 25 having a desired frequency response characteristic whereby the control at certain speeds may be made more or less effective as desired. A rectifier indicated at 26 and a filter indicated at 27, is also provided in a supply lead 28 through which a control potential is applied to the volume control tubes or other means in the receiver for controlling the volume. The arrangement is such that as the vehicle moves at a higher rate of speed, the generator is driven more rapidly by the propeller or air motor to apply a generally increasing potential, controlled by said network 26, through the lead 28 to the receiver to increase the volume. Since any suitable volume control circuit may be provided, further description is believed to be unnecessary. It will be noted, however, that the network 26 is adjustable for the purpose of changing the control characteristic of the volume control as desired.

Referring now to Fig. 3, an automobile radio receiver indicated at 30 is provided with the usual antenna 31 and ground connection 32 for receiving signals and the audio frequency signal output from the receiver is taken through output leads indicated at 33. A volume control potentiometer 34 is bridged across the circuit 33 to control the signal potential or volume applied to a loudspeaker voice coil indicated at 35. The potentiometer 34 is provided with a movable contact 36 which is connected through a lead 37, a switch 38 and a lead 39 with the voice coil 35. The return lead from the voice coil 35 is indicated at 40.

The switch 38 is of any suitable type having a position A in which direct connection is made between the leads 37 and 39 for directly connecting the loudspeaker voice coil 35 with the volume control potentiometer 34—36. In the position indicated at B, the switch 38 serves to connect between the volume control potentiometer 34—36 and the voice coil 35, a second volume controlling means comprising a potentiometer 41 having a movable contact 42 connected with a movable vane 43 actuated by windage currents in a vehicle for controlling the potentiometer.

In the present example, the potentiometer is mounted, as indicated, in association with the radiator of the automobile to be actuated by the cooling air currents. The air pressure increases with increases in speed to move the potentiometer contact 42 in a clockwise direction to reduce the signal volume provided by the loudspeaker. To this end, the potentiometer 41—42 is connected with the contact 42 to one arm of the switch 38, while terminals 44 and 45 of the potentiometer 41 are connected with the one contact at D and the lead 40 through extension leads indicated at 46, the latter leads being extended any suitable distance from the apparatus to the preferred location for the potentiometer 41.

The circuit connections through the leads 46 to the potentiometer 41 are such that with the switch 38 in the position B, the potentiometer 41 is connected between the leads 37 and 40 and the lead 39 is connected with the movable contact 42. It will be seen that adjustment of the contact 42 thus serves to select any portion of the signal potential available between the leads 37 and 40, as determined by the position of the manual volume control contact 36. The manual volume control and speed control are independent of each other in controlling the signal volume or sound output delivered by the loudspeaker.

The movable vane controlling the contact 42 is provided with retracting means such as a spring, indicated at 47, and is preferably provided also with a damping means indicated, in the present example, by a dashpot 48 having a plunger 49 connected with the arm carrying the contact 42. The vane 43 is pivotally mounted at the point indicated at 50. The vane is shown in its normal position with the vehicle at rest or at relatively low speed.

With the vane in the position shown, the speed control of volume is substantially independent of engine speed and is controlled by the speed of the vehicle. By utilizing an air vane to control a circuit element, such as a variable resistor or potentiometer, it will be seen that no connection need be made with any moving part of the vehicle although it has been proposed to provide a speed controlling connection for a circuit controlling element with a moving part, such as a speedometer shaft. The vane type of control is, however, at present preferred particularly when provided with suitable damping means, whereby the volume control is responsive to average changes in air speed and is not responsive to gusts of air or irregularities in the air speed caused by driving into the wind.

In the event that it is desired to control the volume in accordance with the changes in engine speed, the movable vane 43 may be mounted in a position as indicated in Fig. 6 adjacent to the cooling fan 52, which is driven by the engine 53 as indicated by the belt connection 54. Connection with the leads 46 is the same as for the position shown in Fig. 3.

It will be seen that, in the position shown in Fig. 6, the vane may receive air currents dependent upon the speed of the automobile and the speed of the fan 52 which is driven by the engine. Therefore, the vane will move in response to the combined air currents from the cooling fan and from the windage, making the volume control dependent upon both the windage noise and the engine noise for control of volume. In any case, the volume is arranged to be increased with increase in speed of either the engine or of the automobile.

The windage control of volume may, however, be provided by other suitable means, and the pivoted or movable vane may be arranged to be actuated by any suitable movable element which may be actuated by air flow or windage about the vehicle in motion. In any case the movable element is preferably provided with damping means and may, as shown, be mounted to respond to both the speed of the vehicle and the speed of the engine.

It has been found that the volume control arrangement shown in Fig. 3 provides a system readily adaptable to existing automobile radio receiver installations, requiring only that the voice coil circuit be opened for insertion of the speed controlled volume control potentiometer, the manual control means being already provided in the receiver. In Fig. 3, the manual control means is shown in the voice coil circuit merely by way of example as any suitable volume control means independently operable may be provided.

Referring now to Fig. 4, in which the same reference numerals as in Fig. 3, are used for designating the same parts, a modification of the circuit of Fig. 3 is shown whereby substantially constant load may be maintained upon the receiver output circuit with variations in volume, as determined by the speed of travel. In the present example, the automobile radio receiver 30 provided with output circuit 33 is connected to the voice coil 35 of the loudspeaker through a suitable coupling transformer 56 in the secondary circuit of which is connected a series resistor 57.

A potentiometer device 58, comprising a resistor section 59 having movable contact 60 and a potentiometer section 61 having a movable contact 62, is connected in circuit between the transformer 56 and the loudspeaker voice coil 35 in connection with the resistor 57, to variably control the volume with substantially constant load, being in the form of an L-pad.

The resistor section 59 is connected to the signal input side of the series resistor 57 through switch contacts 63 and 64 of a switch 65 in a connecting lead 66. The signal output end of the series resistor 57 is connected with a second switch contact 67 and with one end 68 of the potentiometer device 61 through a connecting lead 69. The opposite end 70 of the potentiometer device 61 is connected through a lead 71 with the secondary of the transformer 56 on the low potential side thereof, whereby the potentiometer section 61 is connected in shunt with the audio frequency circuit on the output end of the series resistor 57. The circuit arrangement is such that the contacts 60 and 62 may be connected directly together or grounded and jointly operated by common means such as a movable air driven vane 72. The direction of movement of the vane in response to air currents or windage resulting from operation of a vehicle is indicated in the drawings. A spring 73 connected with the pivot connection for the contacts, as indicated at 74, serves to cause the contacts to return to an initial position in a clockwise direction, as viewed in the drawings.

The switch 65 may be closed between the contacts 63 and 67 to short-circuit the resistor 57 and to disconnect the resistor 59, whereby only the potentiometer resistor 61 remains across the audio frequency circuit on the output end of the resistor 57. Full volume from the radio receiver, as determined by its adjustment is then permitted.

When the switch is closed to the position shown, operation of the volume control device 58 by the windage flow causes a gradual short-circuiting of the resistor 57 and a gradual transfer of the load across the circuit from the resistor 59 to the loudspeaker voice coil 35. This is permitted through operation of the common movable contact 60—62 along the potentiometer resistance 61 and the resistor section 59 which are both connected in shunt relation to the audio frequency circuit, the one on the output end of the series resistor and the other on the input end.

The system shown has the advantage that it may readily be adapted for connection with any apparatus already installed, since it requires only three connections with the voice coil circuit of the sound producing device or loudspeaker, and this involves only the opening of the circuit and insertion of the series resistor.

The advantage of the system over the system shown in Fig. 3 lies in the use of a load compensating means for the output circuit of the receiver. The arrangement is such that a simple potentiometer device and a simple variable resistor may be arranged to have a common movable contact connected to a vane or other movable element responsive to speed variations.

The resistance of the resistor 57 is such that when in circuit it is of sufficient impedance to reduce the signal current in the output circuit to a relatively low volume. In a circuit as shown, for a voice coil of substantially 4 ohms, it has been found that the resistor 57 may have a resistance of 8 ohms, the resistor 59 may have a resistance of 4 ohms, and the potentiometer device 61 may have a resistance of 16 ohms.

Referring now to Fig. 5, a volume control device for radio receiving apparatus and the like, such as a potentiometer 75, may be provided with a movable arm 76 adapted to be controlled by a speedometer shaft or the like. In the present example, the speedometer gearing 77 and the shaft indicated at 78 for the front axle 79 of an automobile is arranged to drive the arm 76 through a variable coupling connection provided by a rotatable magnet 80 and eddy current disc 81. A biasing spring 82 serves to rotate the disc 81, a connecting shaft 83 and the arm 76 to a position of minimum volume wherein the arm 76 lies adjacent to the terminal as indicated at 84 on the resistor 75. Operation of the automobile or vehicle serves to drive the magnet 80 at a speed proportional to the speed of the car and with increasing speed a greater torque is exerted on the disc 81 causing movement of the arm 76 against the biasing action of the spring 82.

From the foregoing description, it will be seen that radio receiving or other sound producing apparatus, in connection with a vehicle, may, in accordance with the invention, be provided with two volume control means, one of which may be manually or otherwise operated and the other of which may be operated or controlled by speed responsive means, both volume control means having independent control of the receiver or apparatus sound output. The speed control means may, as indicated in Fig. 3, be in the form of a unit separate from the receiver and adapted to be mounted in any suitable position to which control leads from the receiver may be extended.

In operation, the usual manual volume control is adjusted to provide the desired volume level for low operating speeds, and the auxiliary air pressure operated control means serves to maintain a constant ratio of receiver output to the noise encountered between the low speed ranges and the maximum speeds at which the vehicle may be operated.

Considered in a broader aspect, the volume control system above described provides means for controlling the sound output of an electrical sound producing device by a control action proportional to the speed of a vehicle through the intermediary of fluid pressure which, in the usual case, is the air pressure and is variable with and proportional to the speed of the vehicle.

I claim as my invention:

1. The combination with radio receiving apparatus for vehicles, aircraft and the like, of volume control means therefor, and speed responsive means for exerting a control of volume of said apparatus independent of said first named means.

2. The combination with radio receiving apparatus for vehicles, aircraft and the like, of volume control means therefor, and speed responsive means for exerting a control of volume of said apparatus independent of said first named means, said last named means including a volume control circuit, and variable impedance means in said circuit having driving connection with a moving element carried by said vehicle, aircraft and the like and having a rate of movement which varies with and is proportional to the speed.

3. The combination with a vehicle and electrical sound producing apparatus carried thereby, of means for controlling the volume of sound delivered by said apparatus, and means carried by the vehicle and responsive to the speed of travel thereof to control the sound volume independently of said first named means.

4. The combination with mobile sound producing apparatus, of means for controlling the volume of sound delivered by said device, and speed responsive means operatively connected with said apparatus to control said volume independently of said first named means.

5. A volume control system for mobile sound producing apparatus having a sound output device, comprising automatic volume control means, manual volume control means, and speed responsive volume control means connected therewith to control said apparatus independently of said first and second named means.

6. A volume control system for sound producing apparatus for automotive vehicles and the like, comprising manual volume control means therefor, and additional volume control means therefor responsive to variations in speed of a vehicle and of the motive means therefor.

7. In a volume control system for electrical sound producing apparatus for automotive vehicles and the like, comprising manual volume control means, and means for controlling the sound output of said apparatus by a control action conjointly proportional to the speed of the vehicle and of the motive means therefor.

8. The combination with mobile radio receiving apparatus and the like, of means for supplying volume controlling potentials thereto as distinguished from energizing potentials, in accordance with variations in speed of travel, comprising a windage operated generator, a potential supply circuit connected between said generator and said apparatus, and frequency selective filter means in said circuit.

9. A volume control system for mobile radio receiving apparatus and the like, comprising a volume control circuit, a sound producing device, and means connected in said circuit responsive to changes in the speed of travel of a vehicle or craft to which said apparatus is attached, for controlling the sound output level through said sound producing device.

10. The combination with a radio receiver for vehicles, aircraft and the like, and a loudspeaker output device therefor, of manual volume control means for controlling the volume level of sounds produced by said loudspeaker device, and speed responsive means for automatically controlling the volume level of said sounds independently of the manual volume control means.

11. The combination with a radio receiver for vehicles, air craft and the like and loudspeaker output device therefor, of manual volume control means for controlling the volume level of sounds produced by said loudspeaker device, speed responsive means for automatically controlling the volume level of said sounds independently of the manual volume control means, said last named means comprising a volume control circuit for said receiver, a variable impedance device in said circuit, and a movable element responsive to air pressure connected with said last named device to vary the impedance thereof.

12. The combination with apparatus for producing electrical sound-representing-signals and a sound output device therefor, of manual volume control means for controlling the volume level of sounds produced by said output device, and means responsive to changes in the speed of travel of a vehicle or craft to which said apparatus is attached, for independently further controlling said sound volume level.

13. The combination with radio receiving apparatus for vehicles, aircraft and the like, of volume control means therefor, and means independent of said first named volume control means in said apparatus for varying the sound output therefrom in accordance with changes in the speed of travel of said vehicle, aircraft and the like.

14. The combination with a vehicle and electrical sound producing apparatus carried thereby, of means for controlling the volume of sound delivered by said apparatus, means carried by the vehicle and responsive to the speed of travel thereof to control the sound volume independently of said first named means, said speed responsive volume control means including a movable element arranged to receive fluid pressure to move it in response to the flow of air currents about the vehicle in motion, and a second volume control device in circuit with said apparatus and connected with said movable element to be actuated by movement thereof.

15. The combination with radio receiving apparatus for vehicles, aircraft and the like, of manual volume control means therefor, and fluid pressure operated volume control means connected with said apparatus and independently operable with respect to said first named volume control means, said second named volume control means being arranged to receive from the surrounding fluid medium, fluid pressure resulting from and proportional to the speed of travel through said medium, and comprising a movable control element exposed to said medium and movable thereby in one direction in response to said pressure, and means providing a constantly acting restoring force to said element to move it in the opposite direction.

16. The combination with radio receiving apparatus for vehicles, aircraft and the like, of manual volume control means therefor, volume control means connected with said apparatus and independently operable with respect to said first named volume control means, said last named means including a control element movable in one direction to reduce the volume and in another direction in response to fluid pressure to increase the volume, and additional means providing a constantly acting restoring force for moving said element in the first direction.

17. In a volume control system for mobile radio receiving apparatus, and the like, the combination of manual volume control means and automatic volume control means, said last named means comprising a windage pressure operated movable element, means providing a constantly acting restoring force on said element to move it against said pressure, and an electrical circuit controlling element connected therewith to be actuated thereby.

18. The combination with an amplifier for an automobile radio receiver having automatic volume control means and manual volume control means, of means connected with said amplifier for increasing the volume of the output of said receiver automatically in response to increases in speed of an automobile in motion above a predetermined speed, and means for rendering said last named means ineffective to control said volume.

19. In an automotive vehicle, the combination with a radio receiver, of means for energizing said receiver, and means independent of said energizing means for gradually increasing the sound output level of the receiver with increased speed of said vehicle, said last named means including a gain controlling circuit for said receiver, an electrical control device therein having a movable control element, and a windage driven vane connected with said element to move the latter in a direction to increase the gain with increased speed.

IRVING WOLFF.